Nov. 30, 1937.   J. McDONALD   2,100,971
PLATE GLASS CARRYING TRUCK
Filed Feb. 17, 1934   2 Sheets-Sheet 1

INVENTOR
JOHN McDONALD
BY John J. Lynch
ATTORNEY

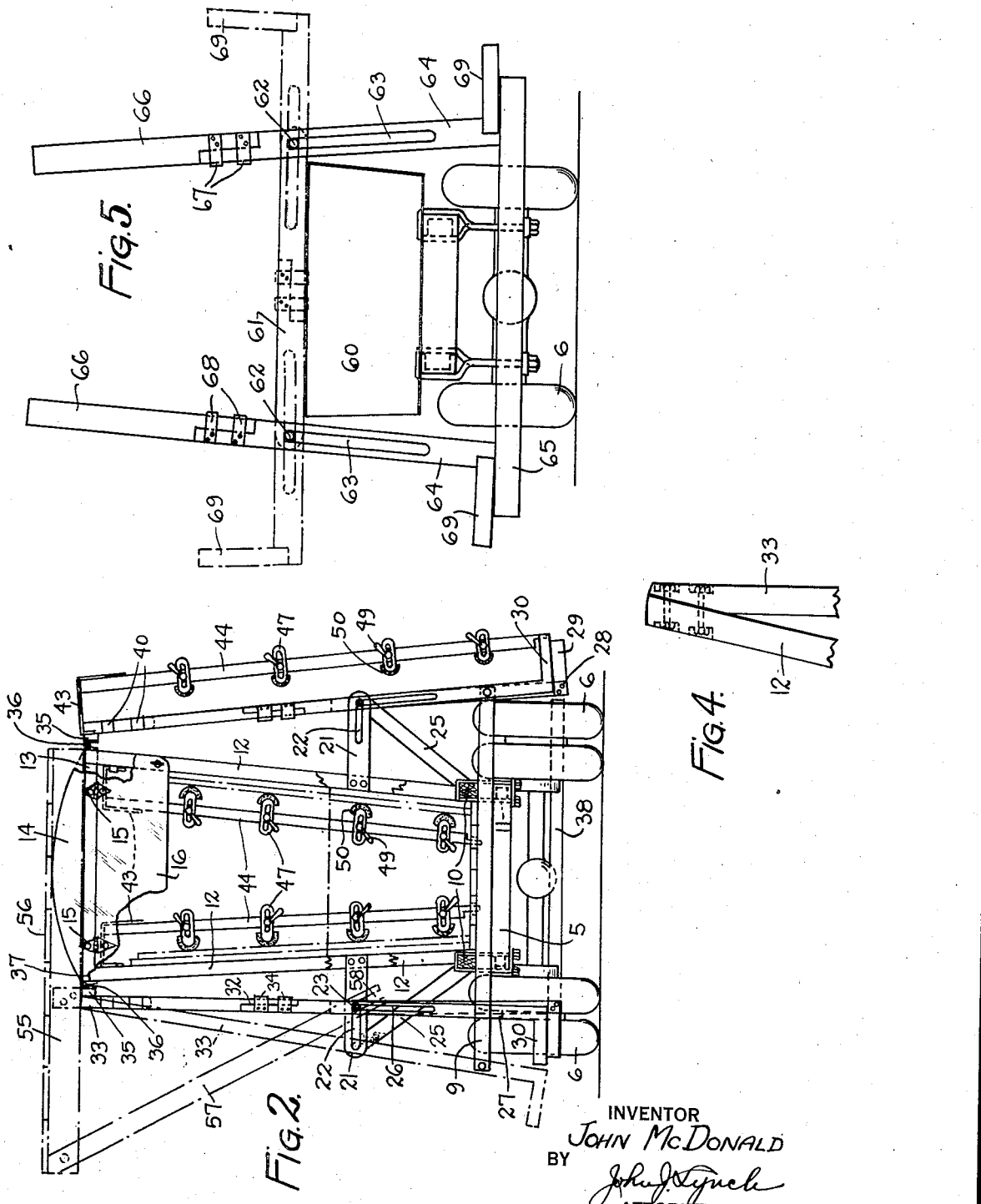

Patented Nov. 30, 1937

2,100,971

UNITED STATES PATENT OFFICE 2,100,971

PLATE GLASS CARRYING TRUCK

John McDonald, Brooklyn, N. Y.

Application February 17, 1934, Serial No. 711,688

7 Claims. (Cl. 296—3)

This invention relates to vehicles and in particular to one used to transport glass where the same is to be placed into show windows, the vehicle being provided with means for holding large panes of glass without violating the law with respect to width of truck employed.

A particular object of my improvement is to provide a truck or vehicle of the character referred to, which contains racks that are carried in vertical position and which can be swung inwardly against the side of the truck body when the same is not employed in carrying large panes of glass.

Another feature of my invention is the provision of interior means in the truck body for also holding large pieces of glass, means being provided for preventing the pieces from rattling or vibrating during transportation and reducing breakage to a minimum.

Other objects of my invention are the provision of means for using the top of the truck as a working platform when the truck may be positioned alongside a building for insertion of high window sections or the like, and an extension on the truck racks for accommodating exceptionally large panes of glass.

Changes and variations may be made in the construction shown and described without departing from the principles of the invention or sacrificing its chief advantages; hence such invention is not to be confined to the structure shown in the accompanying drawings, in which, Figure 1 is a view in side elevation of a vehicle constructed in accordance with my invention, the use of an extension on the rack being illustrated, which is employed when long panes of glass are to be transported.

Figure 2 is a view in rear elevation of the vehicle illustrated in Figure 1, showing the addition of a platform on top of the truck and one of the side racks thereof in closed position.

Figure 4 is a fragmentary view of a means employed in making a non-hinging rack which is built solidly to the side of the vehicle, and Figure 5 is a view in rear elevation showing a modified form of vehicle construction in which the side racks are foldable to a position to provide a glass supporting top surface on the vehicle.

Figures 1, 3:
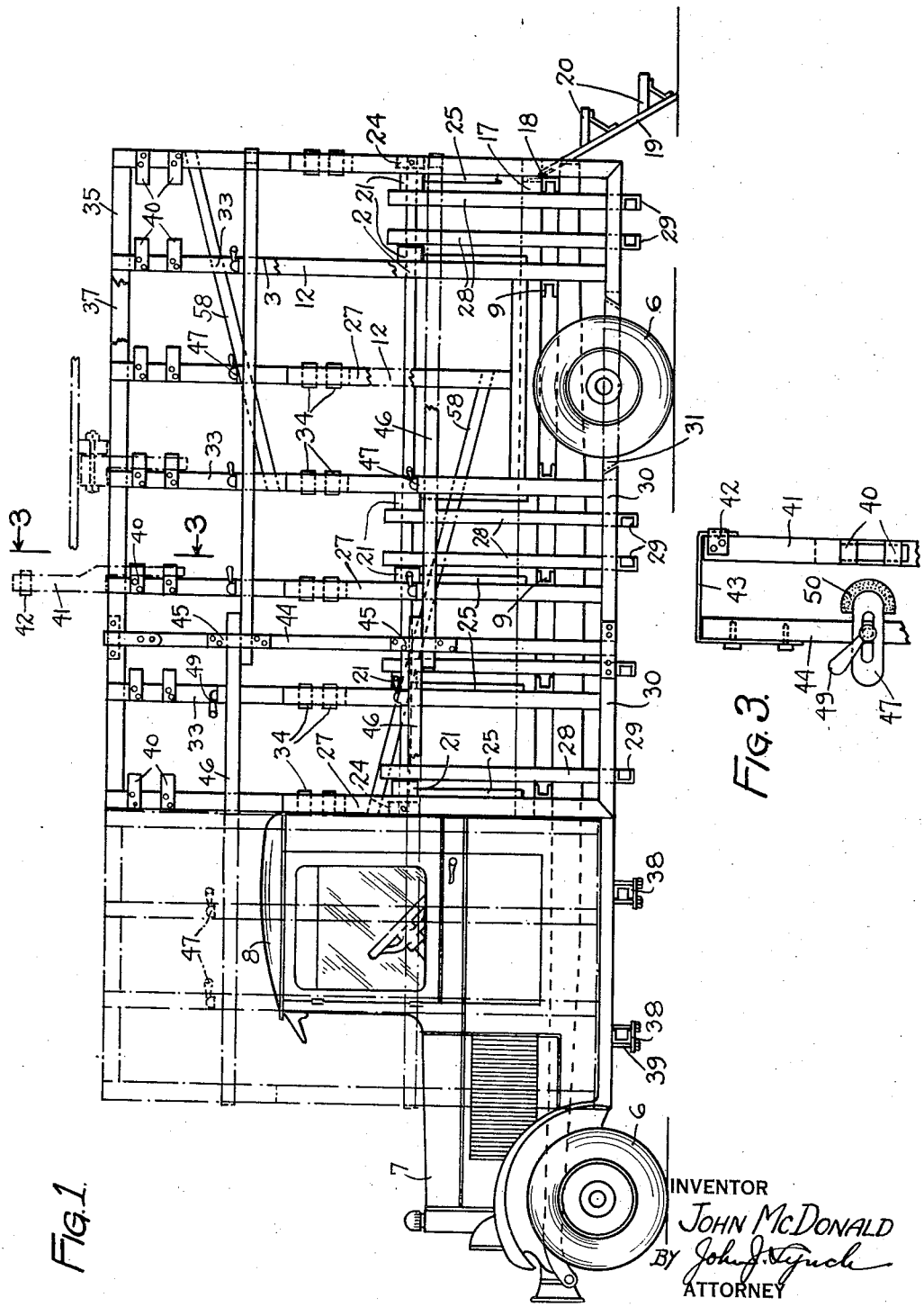
Figure 3 is a section taken on the line 3—3 of Figure 1 showing how the upper ends of the rack pieces are arranged to hold extensions for the purpose of elongating the vertical racks or adapting a working platform to the top of the truck.

Referring to the drawings in detail, 5 indicates the chassis of a motor vehicle or truck which is of the usual channel iron construction and arranged in the usual manner on the wheels 6 and carrying the driver's cab and engine housing 7 and 8 respectively. The difficulty of handling large panes of glass is evident and in order to transport the same without illegally increasing the width of a truck or endangering the lives of passing motorists, I provide at each side of the truck, a glass holding rack which may be built solid or hinged for swinging movement.

The chassis 5 is arranged to have secured thereto in any suitable manner, the cross channels 9 which extend laterally of the chassis and slightly beyond the wheels 6. Supported on the channels 9 and substantially in alignment with the longitudinally extending parts of the chassis are the side rails or sills 10 which are secured to the chassis by U-bolts 11, and have bolted thereto at spaced intervals, the uprights 12 which are tilted slightly outward from bottom to top and are connected laterally at the top by the top members 13. At the rear, the uprights are connected by a strip 14, to which is hinged as at 15, an upper tail piece 16, which is wide enough to serve as a sign board. These tail piece supporting uprights are also connected at the bottom by a strip 17 to which is hinged as at 18, the lower tail board 19, on the inner surface of which is provided the steps 20, so that when the tail board 19 is opened, it will reach the ground and afford ready access to the interior of the truck and also provide a means that will assist in the loading operation.

Above the chassis, the uprights are provided with the brackets 21 having a slotted opening 22 through which passes a longitudinally extending bar 23, there being one of the brackets on each of the uprights 12. Suitable collars 24 on the ends of the bars 23 prevent longitudinal movement thereof. As each side of the truck construction is substantially the same, only one side will be further described. The brackets 21 are each supported by a brace 25, the lower end of which is bolted or otherwise secured to the side member 10. The bar 23 passes through a slot 26 in a lower rack upright 27, any desired number of which are provided depending upon the length of the truck, the bar also passing through the metallic, channelled, L-shaped rack supports one of each of which is preferably provided for each of the members 27 and is designated by the numeral 28.

The bottom portions 29 of the rack supports 28 carry the plank 30 whose upper surface may be covered with felt and upon which is arranged to rest the glass being transported. The rack itself is carried, when not in use, against the side of the truck or in closed position and in order to permit closing movement a piece 31 is removably positioned in the plank 30 to permit passage of the rack over the truck wheels.

The upper ends of the uprights 27 are undercut as at 32 to receive like ends of upper rack pieces 33 which are retained in relatively sliding relation by the iron straps 34. The lower rack parts 27 are carried both by the bar 23 and the rack supports 28 while the upper parts 33 are joined by the longitudinal strip 35 which in turn is hinged as at 36 to a longitudinal strip 37 which joins the upper ends of the body uprights 12. When the rack is to be used to carry large panes of glass, it is swung outwardly on its hinges and bolted to the ends of the cross member 9. This swinging movement causes the lower part of the rack to travel horizontally because of the attachment of said rack part to the bar 23, but the slip joint connecting the parts 27 and 33 of the rack permits this movement. The slot 22 in bracket 21 limits the swinging movement of the rack.

As shown in outline in Figure 1, the rack may be enlarged by the use of an extension rack made similar to the one already described but omitting the bar and support elements, and arranged to be bolted to the main rack and supported on the extended ends of front cross pieces 38 which are supported from the chassis by suitable U-bolts 39. Means are also used for extending the main rack upwardly by the use of straps 40 arranged to receive the lower ends of extension pieces 41 which may be of any length desired and each of which are provided with a strap 42 to receive the turned over end of a metal hook 43 which is secured to the upper end of each of a plurality of rack hanger strips 44. One of these strips may be provided in alignment with each of the rack uprights, or a single one may be used as illustrated in Figure 1 on which metal straps 45 are employed for the purpose of holding horizontal hanger strips 46, in connection with which may be employed the adjustable holders 47. These holders 47 are slotted as at 48 and have an adjusting screw 49 therein through the medium of which they may be moved toward and away from the glass panes held in the rack, the ends of said holders being covered with felt as at 50.

The lower ends of the members 44 are undercut and may fit into suitable cut-outs in the plank 30 which cut-outs are covered by straps 51. The outer ends of the horizontal strips 46 are also provided with hooks 43 for engagement about the end uprights of the rack.

As a further modification of my invention it is possible to securely attach the upper ends of the rack members 33 to the upper ends of the uprights 12 by the bolts 52 instead of by the hinges (see Figure 4).

The body uprights are also provided on their inner top edges with straps 53 which are arranged to receive the hooks 43 of interior rack hanger strips which also carry the holders 47 to brace panes of glass carried inside the truck, the truck body uprights constituting interior racks and the bottom ends of the hanger strips 44 extending through suitable openings in the floor 17.

The straps 40 at the upper ends of the rack members may also be used to receive extension pieces 54 to which are bolted the floor beams 55 which rest on the upper ends of the uprights 12 and extend out over one side of the truck (see Figure 2) to support a flooring 56 and provide a platform upon which workmen may stand when the truck is alongside a building. The beams 55 are secured at their outer ends to brace pieces 57 the lower ends of which are slotted as at 58 to fit over the bar 23. Metal strips 58 may be employed if desired to brace the racks.

A further modified form of truck construction is illustrated in Figure 5 in which the truck body indicated at 60, carries the cross members 61, through which passes a bar 62, passing also through a slot 63 in the rack upright 64, any number of which are provided as desired. While these rack constructions are shown as resting on the support bars 65, they may be swung outwardly and bolted in this position to the bars 65. The upper ends of the uprights 64 are undercut to fit into similar undercuts of extension pieces 66, one of the extensions having straps 67, while the other or opposite uprights are provided with straps 68. This construction is for carrying large panes of glass in vertical position, but when smaller work is to be accommodated, and the truck used flat, the extensions 66 are removed and the members are swung about their pivot points on the bars 62 and in horizontal position may be secured together by engagement of the undercut portions and the straps 68. The usual bottom plank is employed in this construction to provide bottoms 69 for the racks and these planks form sides when the racks are in the position shown in outline.

My invention is not to be restricted to the precise details of construction shown, since various changes and modifications may be made therein without departing from the scope of the invention or sacrificing the advantages derived from its use.

What I claim is:

1. The combination with a vehicle, of a pair of side racks, one being positioned on each side of the vehicle, a support means upon which said racks are pivotally mounted, said racks being slotted to receive said support means whereby the racks can be moved from vertical position alongside the vehicle to horizontal position atop thereof, and means for joining the ends of the racks when the same are in horizontal position.

2. The combination with a vehicle, of side rack members, means for pivotally supporting said racks, slots in the racks through which said support means extend, means for attaching extension pieces to the upper ends of the racks, said racks being movable from vertical position alongside the vehicle to horizontal position atop thereof, and said extension attaching means being arranged to hold the ends of the racks when the same are in horizontal position.

3. The combination with a vehicle, of inner and outer racks, uprights constituting the body of the truck to which the racks are secured, platform support extensions on said racks, floor beams secured to said extensions and a platform on said floor beams, said platform extending out beyond one side of said vehicle and constituting a scaffold.

4. The combination with a vehicle, of inner and outer racks, said outer racks comprising relatively movable upper and lower rack pieces, a bar upon which said lower rack pieces are secured, brackets for permitting horizontal movement of the bar, and rack supports pivoted on said bar and arranged to underlie the bottom edges of said racks.

5. The combination with a vehicle, of glass supporting racks, said racks comprising relatively movable upper and lower rack pieces, a bar upon which said lower rack pieces are secured, brackets for permitting horizontal movement of the bar, and rack supports pivoted on said bar and arranged to underlie the bottoms of said racks.

6. A glass carrying vehicle including a side frame on which glass is supported including a foot piece, a plurality of outer members arranged to be supported on said foot piece, said foot piece having an opening for receiving the lower end of each outer member, a hook on the upper end of each outer member, a stirrup for receiving the end of the hook whereby the same has free engagement with the rear face of the frame at the top thereof so that said outer members can be lifted off the frame by a person standing on the ground, a plurality of glass engaging holders on each of said outer members, and means for adjusting said holders toward and away from said frame.

7. In a glass carrying vehicle, in combination, a fixed side frame, a foot piece on said frame, the side frame and foot piece being adapted to support a pane of glass, outer members resting on said foot piece and having an upper end arranged to hook over the upper edge of said fixed side frame whereby the outer members can be lifted off from the ground, holders on said outer members for engaging and holding the glass in place against the side frame, and means for individually adjusting said holders toward and away from the side frame.

JOHN McDONALD.